US012681646B2

(12) United States Patent
Chiew et al.

(10) Patent No.: US 12,681,646 B2
(45) Date of Patent: Jul. 14, 2026

(54) PADDING DATA FOR A NON-VOLATILE MEMORY DEVICE

(71) Applicant: MICRON TECHNOLOGY, INC., Boise, ID (US)

(72) Inventors: Chonggiap Chiew, Singapore (SG); Sean Brasfield, Boise, ID (US); Tawalin Opastrakoon, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 11 days.

(21) Appl. No.: 18/816,756

(22) Filed: Aug. 27, 2024

(65) Prior Publication Data

US 2026/0064287 A1    Mar. 5, 2026

(51) Int. Cl.
G06F 3/06          (2006.01)

(52) U.S. Cl.
CPC ............ G06F 3/0619 (2013.01); G06F 3/064 (2013.01); G06F 3/0679 (2013.01)

(58) Field of Classification Search
CPC ....... G06F 3/0619; G06F 3/064; G06F 3/0679
See application file for complete search history.

(56) References Cited

U.S. PATENT DOCUMENTS

| | | | |
|---|---|---|---|
| 7,251,712 B2 | 7/2007 | Unno | |
| 10,186,309 B2 | 1/2019 | Oh et al. | |
| 10,621,043 B2 | 4/2020 | Casper et al. | |
| 10,692,555 B2 | 6/2020 | Oh et al. | |
| 10,949,094 B2 | 3/2021 | Lee et al. | |
| 2009/0327802 A1* | 12/2009 | Fukutomi | G06F 11/1068 |
| | | | 714/6.2 |
| 2016/0283110 A1* | 9/2016 | Jain | G06F 13/1668 |
| 2019/0356468 A1* | 11/2019 | Zeh | H04L 9/0631 |
| 2020/0167279 A1* | 5/2020 | Palmer | G06F 12/0804 |
| 2022/0116215 A1* | 4/2022 | Leggette | H04L 63/0428 |

* cited by examiner

*Primary Examiner* — Hosain T Alam

*Assistant Examiner* — Subir Kumar Chowdhury

(74) *Attorney, Agent, or Firm* — Tarolli, Sundheim, Covell & Tummino LLP

(57)          ABSTRACT

A method for managing data in a non-volatile memory system includes generating, by a randomizer integrated on a die of a memory device, padding data to close a memory block for a data write operation. The padding data is random data. The method includes programming, by a media controller of the memory device, the padding data into specified memory pages in a data block within the memory device. The data block stores user data for the data write operation and the padding data. The method includes executing, by a memory controller and by the media controller, a data integrity scan on a selected memory page of the specified memory pages of the data block. Execution of the data integrity scan includes re-generating, by the randomizer, the padding data and comparing the re-generated padding data with stored padding data sensed from the selected memory page to identify mismatch data.

17 Claims, 9 Drawing Sheets

100

Figure 1B:
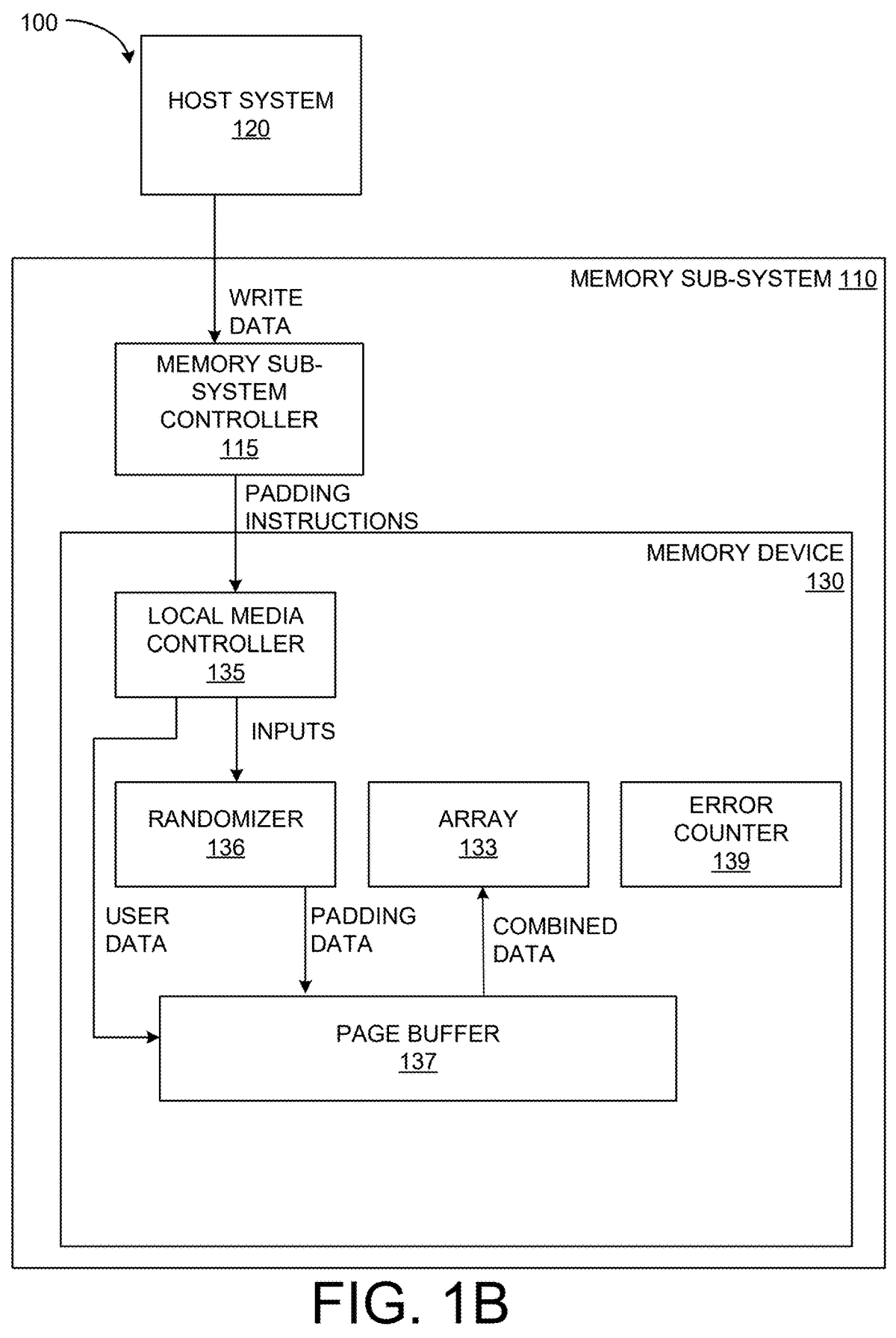

100

HOST SYSTEM
120

MEMORY SUB-SYSTEM 110

WRITE
DATA

MEMORY SUB-
SYSTEM
CONTROLLER
115

PADDING
INSTRUCTIONS

MEMORY DEVICE
130

LOCAL MEDIA
CONTROLLER
135

INPUTS

RANDOMIZER
136

ARRAY
133

ERROR
COUNTER
139

USER
DATA

PADDING
DATA

COMBINED
DATA

PAGE BUFFER
137

| Wordline | Page | | | |
|---|---|---|---|---|
| 0 | LP 0 | LP 1 | LP 2 | LP 3 |
| | UP 0 | UP 1 | UP 2 | UP 3 |
| | XP 0 | XP 1 | XP 2 | XP 3 |
| 1 | LP 4 | LP 5 | LP 6 | LP 7 |
| | UP 4 | UP 5 | UP 6 | UP 7 |
| | XP 4 | XP 5 | XP 6 | XP 7 |
| 2 | LP 8 | LP 9 | LP 10 | LP 11 |
| | UP 8 | UP 9 | UP 10 | UP 11 |
| | XP 8 | XP 9 | XP 10 | XP 11 |
| ... | ... | ... | ... | ... |
| 25 | LP 100 | LP 101 | LP 102 | LP 103 |
| | UP 100 | UP 101 | UP 102 | UP 103 |
| | XP 100 | XP 101 | XP 102 | XP 103 |
| 26 | LP 104 | LP 105 | LP 106 | LP 107 |
| | UP 104 | UP 105 | UP 106 | UP 107 |
| | XP 104 | XP 105 | XP 106 | XP 107 |
| ... | ... | ... | ... | ... |
| 233 | LP 932 | LP 933 | LP 934 | LP 935 |
| | UP 932 | UP 933 | UP 934 | UP 935 |
| | XP 932 | XP 933 | XP 934 | XP 935 |

USER DATA

PADDING DATA

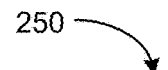

250

| Wordline | Page | | | |
|---|---|---|---|---|
| 0 | LP 0<br>UP 0<br>XP 0 | LP 1<br>UP 1<br>XP 1 | LP 2<br>UP 2<br>XP 2 | LP 3<br>UP 3<br>XP 3 |
| 1 | LP 4<br>UP 4<br>XP 4 | LP 5<br>UP 5<br>XP 5 | LP 6<br>UP 6<br>XP 6 | LP 7<br>UP 7<br>XP 7 |
| 2 | LP 8<br>UP 8<br>XP 8 | LP 9<br>UP 9<br>XP 9 | LP 10<br>UP 10<br>XP 10 | LP 11<br>UP 11<br>XP 11 |
| ... | ... | ... | ... | ... |
| 25 | LP 100<br>UP 100<br>XP 100 | LP 101<br>UP 101<br>XP 101 | LP 102<br>UP 102<br>XP 102 | LP 103<br>UP 103<br>XP 103 |
| 26 | LP 104<br>UP 104<br>XP 104 | LP 105<br>UP 105<br>XP 105 | LP 106<br>UP 106<br>XP 106 | LP 107<br>UP 107<br>XP 107 |
| ... | ... | ... | ... | ... |
| 233 | LP 932<br>UP 932<br>XP 932 | LP 933<br>UP 933<br>XP 933 | LP 934<br>UP 934<br>XP 934 | LP 935<br>UP 935<br>XP 935 |

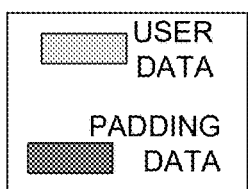

USER DATA

PADDING DATA

| RETRIEVE WRITE DATA COMMAND | — 310 |

| DETERMINE INSTRUCTIONS FOR PADDING DATA | — 315 |

| OUTPUT INSTRUCTIONS TO LOCAL MEDIA CONTROLLER | — 320 |

| PROVIDE INPUTS TO RANDOMIZER | — 325 |

| GENERATE PADDING DATA | — 330 |

| PROVIDE USER DATA TO PAGE BUFFER | — 335 |

| PROVIDE PADDING DATA TO PAGE BUFFER | — 340 |

| PROGRAM COMBINED DATA TO ARRAY | — 345 |

400

INITIATE DATA INTEGRITY SCAN — 410

PROVIDE DATA INTEGRITY SCAN TO LOCAL MEDIA CONTROLLER — 415

READ DATA FROM ARRAY — 420

PROVIDE INPUTS TO RANDOMIZER — 425

RE-GENERATE PADDING DATA — 430

COMPARE RE-GENERATED PADDING DATA AND STORED DATA — 435

WRITE MISMATCH DATA TO PAGE BUFFER — 440

DETERMINE MISMATCH COUNT — 445

OUTPUT MISMATCH COUNT — 450

PADDING DATA FOR A NON-VOLATILE MEMORY DEVICE

TECHNICAL FIELD

This disclosure relates to generating padding data for a non-volatile memory device.

BACKGROUND

A memory sub-system includes a memory device designed for data storage. These memory devices are implemented as non-volatile and volatile memory devices in various examples. In some such examples, a host system employs a memory sub-system for the purposes of storing data on the memory devices and for retrieving data from the memory devices.

Data padding refers to the process of adding non-essential data to a data block to meet specific size or alignment specifications. Data padding is leveraged for enhancing system performance, particularly in memory alignment, where data padding improves processing speed and stability. In storage technologies like Not-AND (NAND) flash memory, data padding is employed to manage block and page utilization, maintain data integrity and ensure consistent operational processes, thereby improving the overall efficiency and reliability of data storage systems.

BRIEF DESCRIPTION OF THE DRAWINGS

FIG. 1B illustrates a process flow of the system of FIG. 1A depicting operations of a write data command.

FIG. 2B illustrates another example of a closed memory block with user data and padding data written to separate pages.

DETAILED DESCRIPTION

Figure 1A:
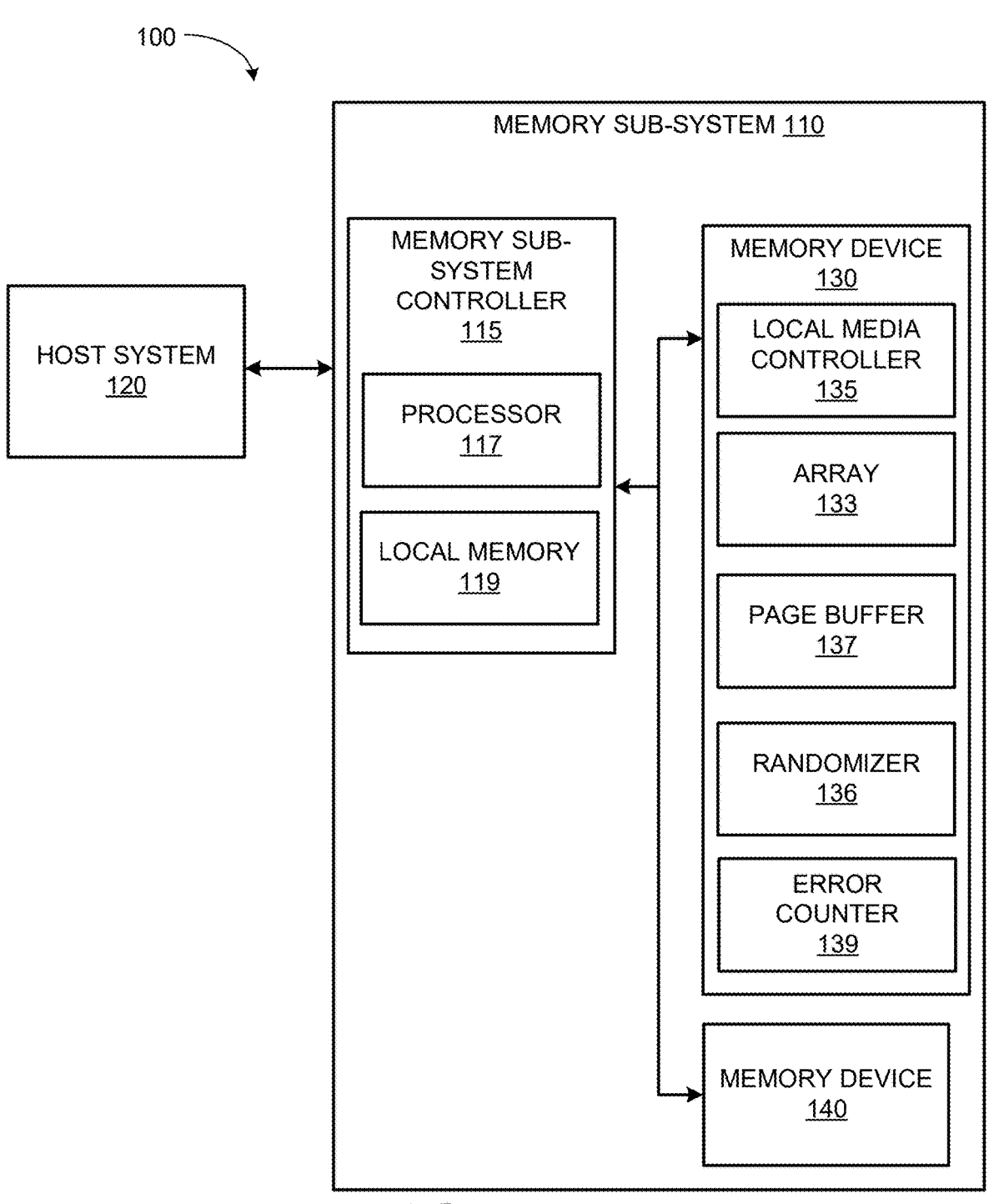
FIG. 1A illustrates a system that includes a memory sub-system for padding user data for a write command and executing a data integrity scan.

This description relates to managing non-volatile memory by integrating data padding and error detection directly onto a memory die (e.g., a memory device). The memory die is configured to automate the generation of padding data (random data) and the subsequent error detection process within the memory chip itself, using an on-die randomizer to generate data patterns and internal circuitry to perform error checks. A memory controller configures a start and end memory pages for padding, enhancing flexibility and efficiency. Implementing the operations on the memory chip reduces the operational overhead on external systems (including the memory controller), speeds up data processing and improves the reliability and integrity of data storage by allowing for quicker and more accurate data integrity scans, ultimately enhancing the performance and lifespan of non-volatile memory systems.

More generally, some examples of a memory sub-system include high density non-volatile memory devices where retention of data is desired during intervals of time where no power is supplied to the memory device. One example of non-volatile memory devices is a Not-AND (NAND) memory device. A non-volatile memory device is a package that includes a die(s). Each such die can include a plane(s). For some types of non-volatile memory devices (e.g., NAND memory devices), each plane includes a set of physical blocks, and each physical block includes a set of pages that are organized in wordlines. Each page includes a set of memory cells, which are commonly referred to as cells. A cell is an electronic circuit that stores information. A cell stores at least one bit of binary information and has various logic states that correlate to the number of bits being stored. The logic states are be represented by binary values, such as '0' and '1', or as combinations of such values, such as '00', '01', '10' and '11'.

A memory device includes multiple cells arranged in a two-dimensional or a three-dimensional grid. In some examples, memory cells are formed on a silicon wafer in an array of columns connected by conductive lines (also referred to as bitlines, or BLs) and rows connected by conductive lines (also referred to as wordlines or WLs). A wordline has a row of associated memory cells in a memory device that are used with a bitline or multiple bitlines to generate the address of each of the memory cells. The intersection of a bitline and a wordline defines an address of a given memory cell.

A block refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A solid-state drive (SSD) is an example of a memory sub-system that includes a non-volatile memory device(s) and a memory sub-system controller to manage the non-volatile memory device(s).

A memory page in the context of non-volatile memory devices, such as NAND memory, refers to a smallest writable unit within the memory structure. Each memory page is formed with of numerous memory cells where data is stored. In NAND memory, for example, a memory page is where actual user data gets written along with additional metadata used for managing the memory and ensuring data integrity. This metadata might include error correction codes (ECC) that help detect and correct errors that might occur during data read/write cycles. The size of a memory page can vary depending on the specific type of memory technology and the manufacturer's design. Common page sizes in NAND flash memory range from 4 KB to 16 KB or more.

Memory pages are organized into wordlines, which are in turn organized into blocks. More specifically, in NAND memory, the relationship between blocks, wordlines and pages is structured hierarchically for operation of the memory. A block represents a fundamental unit of data storage in NAND flash memory and consists of several pages. Wordlines in NAND memory are essentially wirings that connect multiple memory cells across a row. Each wordline activates a specific row of cells during read and write operations, effectively addressing all the cells in a row simultaneously, which corresponds to accessing a single page of data. Wordlines enable addressing and accessing data stored in the memory cells. In effect, a wordline controls access to a set of pages of data. When a specific wordline is activated, all the memory cells along that wordline can be accessed simultaneously. This means that each page corresponds to a wordline, and the data stored in a page is written to or read from the memory cells that the wordline addresses. When data is written to NAND flash memory, the organization and storage occur at the page level. This hierarchical structure allows for efficient management of data.

The memory sub-system controller is configured/programmed to encode the host and other data, as part of a write operation, into a format for storage at the memory device(s). Encoding refers to a process of generating parity bits from embedded data (e.g., a sequence of binary bits) using an error correction code (ECC) and combining the parity bits to the embedded data to generate a codeword. LDPC encoding refers to an encoding method that utilizes a low density parity check (LDPC) code to generate the parity bits.

Additionally, the memory sub-system controller can decode codewords, as part of a read operation, stored at the memory device(s) of the memory sub-system. Decoding refers to a process of reconstructing the original embedded data (e.g., sequence of binary bits) from the codeword (e.g., the encoded original embedded data) received from storage at the memory device(s). LDPC decoding refers to a decoding method that utilizes the LDPC code to reconstruct the original embedded data.

Data padding, in the context of non-volatile memory involves adding non-essential data to align content with memory block boundaries, enhancing processing efficiency and ensuring data integrity. Data padding is used to fill unused space in memory blocks to ensure data aligns with specific storage or transmission requirements, and data padding is often employed to close memory blocks to prevent data corruption and optimize memory utilization by maintaining consistent block sizes.

In a scenario involving writing data to non-volatile memory, such as NAND memory, consider an application that needs to store 4896 kilobytes of data, but the memory has a block size of 44,928 kilobytes (about 45 megabytes). This example presumes a page size of 48 kilobytes (each page having a lower page, an upper page and an extra page that each hold 16 kilobytes). To fully utilize the storage capacity and maintain data integrity, data padding is employed to add the remaining about 40,032 kilobytes of data to the block. The process begins by generating the about 40,032 kilobytes of padding data, which could be random data (which includes pseudo-random data) that can be easily identified and discarded during data retrieval. This padding data is combined with the user data 4896 kilobytes, resulting in a complete 44,928 kilobyte block. This combined data is subsequently written to the non-volatile memory. By filling the entire block, the system avoids leaving any part of the pages in the block being in an undefined state, which could lead to data corruption or other issues. Additionally, using full pages in the block improves the storage efficiency and simplifies the management of the non-volatile memory, ensuring that write operations leverage a potential of the memory and maintain the integrity of the stored data.

The systems and methods of the present description improve the generation of padding data for the non-volatile memory. Additionally, the systems and methods improve the execution of a data integrity scan on the non-volatile memory in situations where padding has been added in a write operation. As an example, a write operation begins in response to a memory controller of the non-volatile memory completing a data storage operation up to a last data page and the memory controller determines that a block needs to be closed by extending to a final block page, such that padding data needs to be added to a particular set of pages, which can be referred to as padding pages. The padding pages begins at a page following the last data page, which can be referred to as a first padding page and terminates with the final block page.

To generate the padding data, the memory controller provides a padding data command to a local media controller of a non-volatile memory device, such as a memory die on a memory chip. In contrast to a previous approach where the memory controller generates the padding data, the local media controller of the memory die leverages a randomizer integrated on the memory die to autonomously generate a suitable random data pattern (which includes a pseudo-random data pattern). This random data pattern is then directly programmed by the local media controller into the specified pages. This internal handling of data generation and programming not only expedites the process by avoiding the need for data transfer from the controller but also reduces an operational load of the memory sub-system. Consequently, this method enhances overall performance of the memory sub-system, allowing the memory controller to allocate resources to other tasks. Moreover, by ensuring uniform padding of the padding pages in the block, the on-die approach maintains consistency and integrity of the stored data, effectively enhancing memory management and preventing common issues such as data corruption and partially programmed blocks. This streamlined process underscores the capability to integrate advanced functionalities within the die of the memory device, simplifying operations and bolstering reliability and efficiency in memory storage sub-systems.

Periodically and/or asynchronously, the memory controller executes a data integrity scan of a memory page. The data integrity scan is executed to verify the integrity of data stored on a specified page of the memory device. Additionally, in the present example the data integrity scan is executed on a given padding page of the padding pages of the memory device. In a previous approach, such a data integrity scan would involve the memory controller sending a read command to the memory device, which would then sense the data from a memory array and transfer the read data to a page buffer for analysis. However, the present approach streamlines this process considerably. In particular, in the approach described in the present description, the memory controller triggers a feature on the local media controller of the memory die specifically designed for data integrity scans. In response, the local media controller senses (reads) the padding data directly from the given padding page of the array where the padding data is stored. Once the data is sensed, the padding data is temporarily held in the page buffer. Here, the randomizer of the memory die re-generates a random data pattern using the same inputs/parameters (e.g., randomizer seed) used during the initial data padding process. This ensures that the re-generated random pattern matches the random pattern originally written to the given padding page.

Responsive to the re-generation of the random pattern, the randomizer executes an XOR operation between the sensed padding data and the re-generated random pattern directly within the page buffer. This XOR operation identifies discrepancies between the expected pattern and the actual data stored, effectively pinpointing errors without the need for external data processing. An error-counter integrated with the memory die counts the number of mismatching bits, providing a precise measure of data integrity.

The error counter provides the error count to the memory controller, rather than pulling the entire data set for external analysis, as executed in a previous approach. By providing the error count (rather than the data set) the bandwidth and processing power needed to execute the analysis of the data set on memory controller is curtailed. By integrating these functionalities directly onto the memory die, a faster, more efficient and more reliable data integrity scans are executable, thereby enhancing the overall performance and reliability of the memory sub-system.

FIG. 1A illustrates a system 100 that includes a memory sub-system 110 that can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non volatile dual in-line memory modules (NVDIMMs).

The system 100 can be a computing device such as a desktop computer, laptop computer, network server, mobile device, a vehicle (e.g., airplane, drone, train, automobile or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller) and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., PCIe or CXL bus). The physical host interface can provide an interface for passing control, address, data and other signals between the memory sub-system 110 and the host system 120. FIG. 1A illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-volatile, non-transitory computer readable media. The memory device 130 and the memory device 140 can include any combination of the different types of non-volatile memory devices. Some examples of non-volatile memory devices (e.g., memory device(s) 130) include Not-AND (NAND) type flash memory and write-in-place memory, such as three-dimensional cross-point ("3D cross-point") memory. A cross point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 include an array 133 (or multiple arrays) of memory cells. One type of memory cell, for example, single level cells (SLC) can store one bit per cell. Other types of memory cells, such as multi-level cells (MLCs), triple level cells (TLCs), quad-level cells (QLCs) and penta-level cells (PLCs) or higher, can store multiple bits per cell. In some examples, each of the memory devices 130 can have a combination of different types of memory cells such as SLCs, MLCs, TLCs, QLCs, PLCs or some combination thereof. For instance, in some examples, a particular memory device can include an SLC portion, an MLC portion, a TLC portion, a QLC portion and/or a PLC portion of memory cells. The memory cells of the memory devices 130 can be grouped as pages that can refer to a logical unit of the memory device used to store data. In some types of memory (e.g., NAND), pages can be grouped into wordlines and blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), etc.

A memory sub-system controller 115 (or controller 115 for simplicity) communicates with the memory device(s) 130 to perform operations such as reading data, writing data or erasing data at the memory devices 130 and other such operations. The memory sub-system controller 115 can include hardware such as one or more integrated circuits and/or discrete components, a buffer memory or some combination thereof. The hardware can include digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or other suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in concert with the memory sub-system controller 115 to execute operations on one or more memory cells of the memory devices 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

The memory device 130 includes a randomizer 136. The randomizer 136 is integrated with a die of the memory device 130. The randomizer 136 generates random data patterns used in various operations, particularly in data padding and data integrity scans. The randomizer 136 is designed to produce random or pseudo-random data sequences that are used to fill unused pages of memory blocks of the array 133 and/or to provide a reference random pattern for error checking during data integrity assessments. The randomizer 136 operates by taking inputs, such as page addresses, page order (e.g., lower page (LP), upper page (UP) or extra page (XP) in an array that includes TLCs) and/or other parameters, to ensure that the generated random data patterns are unique and appropriate for the specific memory locations being addressed. Thus, these inputs can be considered a randomizer seed.

In various examples, the memory device(s) 130 include a page buffer 137 (e.g., a memory page buffer). The page buffer 137 is employed in read and write operations for the memory device(s) 130. The page buffer 137 is an intermediary storage area that temporarily holds data during the transfer between the memory sub-system controller 115 and the memory device(s) 130. In situations where data is written to the memory device(s) 130, the data is first loaded into the page buffer 137 from the memory sub-system controller 115. From the page buffer 137, the data is then programmed into the appropriate cells of the array 133. Conversely, during a read operation, retrieved data is first placed into the page buffer 137 (e.g., by the local media controller 135) before being sent to the memory sub-system controller 115.

This intermediary role of the page buffer 137 allows for the alignment of data transfer speeds between the (faster) memory sub-system controller 115 and the relatively slower operations executed by the memory device 130. Second, the page buffer 137 facilitates the organization and error checking of data before the data is permanently written to array 133, enhancing data integrity. Additionally, the page buffer 137 supports advanced operations like the XOR function during data integrity scans. Here, the page buffer 137 holds both the sensed data from the array and the generated random pattern (or some portion thereof) from the randomizer 136, enabling an immediate comparison and error detection right within the memory device 130. This integration speeds up the process of data integrity verification and reduces the computational load on the memory sub-system controller 115, streamlining overall memory management.

FIG. 1B illustrates a process flow of the system 100 depicting operations of a write data command. For example, it is presumed that the memory sub-system controller 115 receives the write data command (labeled "WRITE DATA" in FIG. 1B) from the host system 120. The write data command includes user data (e.g., original data) to be written to the memory sub-system 110. In response, the memory sub-system controller 115 determines the need for data writing to the memory device 130 and the need for of padding of the data to ensure efficient memory utilization and data integrity. The memory sub-system controller 115 generates instructions for padding the user data, which can be referred to as padding instructions. The padding instructions can include, for example, a data block address, including page addresses for pages of the data block, as well as the user data included in the write data command. The page addresses can include page addresses that are to hold the user data received by the memory sub-system controller 115 with the write command, as well as page addresses for the padding data. The memory sub-system controller 115 outputs the padding instructions the user data (labeled "PADDING INSTRUCTIONS" in FIG. 1B) to the local media controller 135.

The local media controller 135 provides inputs (labeled "INPUTS" in FIG. 1B) to the randomizer 136 for generating random data for the padding data based on the inputs (e.g., page address, page order, etc.), such that the inputs can be considered parameters, such as a randomizer seed. Both the user data (labeled "USER DATA") in the write command and the padding data (labeled "PADDING DATA" in FIG. 1B) generated by the randomizer 136 are combined to form combined data on the page buffer 137. The page buffer 137 serves as a temporary holding area for the combined data before the combined data (labeled "COMBINED DATA" in FIG. 1B) is written to the array 133. Stated differently, the combined data is programmed to the page addresses identified by the memory sub-system controller 115. The combined data in the page buffer 137 is written to the array 133, where the combined data is stored permanently in the designated memory cells of the array 133. In other examples, rather that combining the user data and the padding data, the user data and the padding data can be written to the array 133 in separate operations.

Figure 2A:
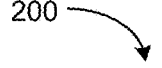
FIG. 2A illustrates an example of a closed memory block with a memory page that has user data and padding data.

Accordingly, responsive to the write data command received at the memory sub-system controller 115, the user data is written to a first portion of a memory block, and the padding data (a random pattern) is written to a second portion of the same memory block. Additionally, as demonstrated in FIG. 2A, the same page may contain both user data and padding data. FIG. 2A illustrates this concept. More particularly, FIG. 2A illustrates an example of a closed memory block 200 that includes user data and padding data (random data). It is presumed that the memory block 200 has 936 pages, and each page holds 48 kilobytes of data. More particularly, in the example illustrated, it is presumed that the memory cells for the memory block 200 (e.g., formed in the memory device 130) are TLCs that each hold 3 bits of data. Accordingly, each page in the memory block 200 has a lower page (LP), an upper page (UP) and an extra page (XP), and each LP, UP and XP hold 16 kilobytes of data. In the memory block 200, pages LP 0 to LP 102 are user data (data included in a write data command), and page UP 102 to XP 935 are filled with the padding data (e.g., random data formed by the randomizer 136). Moreover, as illustrated, a portion of page 102, namely the LP 102 has user data and another portion of page 102, namely the UP 102 and the XP 102 are filled with the padding data. Stated differently, the set of page numbers UP 102-XP 935 are the padding pages for the data write. In this manner, as illustrated, the memory block 200 is closed. In this example illustrated, the user data and the padding data are written to the LP 102, the UP 102 and the XP 102 in the same command.

Referring back to FIG. 1B, as noted, in some situations, the user data and the padding data can be written to the array 133 in separate operations of the memory device 130, avoiding the need to provide the combined data. In this case, the user data is written from the page buffer 137 to the array 133 in a particular command, and in a next command the padding data is written to the array 133. FIG. 2B illustrates this concept. FIG. 2B illustrates an example of a closed memory block 250 that includes user data and padding data (random data). It is presumed that the memory block 250 has 936 pages (the same number as the memory block 250), and each page holds 48 kilobytes of data. More particularly, in the example illustrated, it is presumed that the memory cells for the memory block 250 (e.g., formed in the memory device 130) are TLCs that each hold 3 bits of data. Accordingly, each page in the memory block 250 has an LP, a UP and an XP, and each LP, UP and XP hold 16 kilobytes of data. In the memory block 250, pages LP 0 to XP 101 store user data (data included in a write data command), and page LP 102 to XP 935 are filled with the padding data (e.g., random data formed by the randomizer 136). Stated differently, the set of page numbers LP 102-XP 935 are the padding pages for the data write. In this manner, as illustrated, the memory block 250 is closed. In this example illustrated, one command fills page 101 (LP 101, UP 101 and XP 101), with user data, and a next command writes padding data to LP 102, UP 102 and XP 102. Thus, in the example illustrated in FIG. 2B, there is no need to write combined data (user data and padding data) to any of the pages of the memory block 250.

Referring back to FIG. 1A, this sequence ensures efficient use of the storage capacity of the memory device 130 and maintains high data integrity, facilitated by integrating the operations of the randomizer 136 onto the die of the memory device 130 rather than generating the random data on the memory sub-system controller 115. More particularly, during the write operation, the randomizer 136 generates random data patterns for the padding data of the combined data that is directly programmed into the array 133, bypassing the need for external data generation and loading, thereby enhancing the efficiency of memory utilization.

Figure 1C:
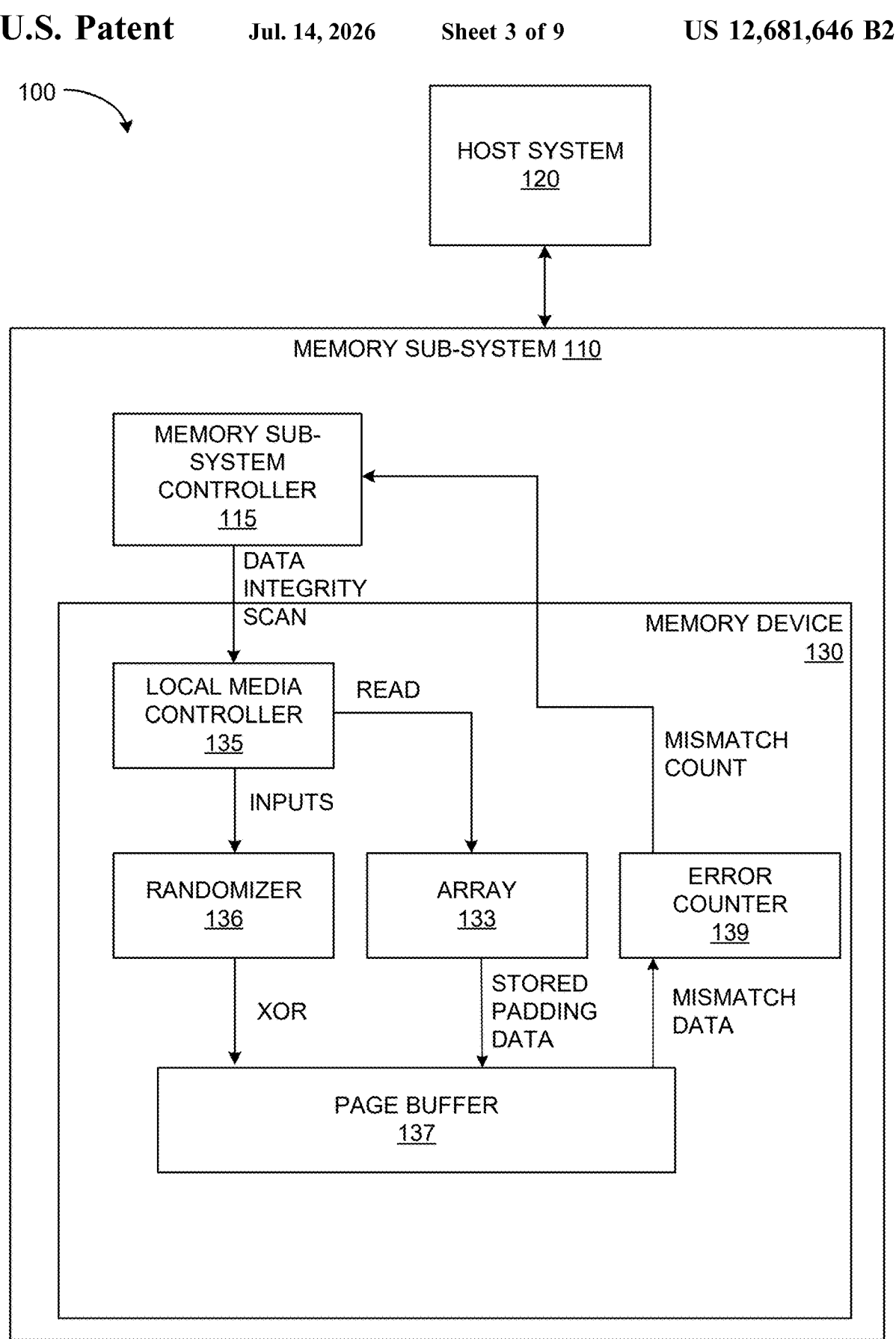
FIG. 1C illustrates a process flow of the system of FIG. 1A depicting operations of a data integrity scan.

FIG. 1C illustrates a process flow of the system 100 depicting operations of a data integrity scan. More particularly, periodically and/or asynchronously, the memory sub-system controller 115 executes a data integrity scan on a specified page with padding data (random data). For example, suppose that the specified page is the lower page (LP) of the page number 102 in the block 200 of FIG. 2. The data integrity scan could be executed, for example, in response to the host system 120 sending a request to perform a data integrity scan (e.g., a data integrity scan request) on pages (or a single page) within the memory device 130. This command is processed by the memory sub-system controller 115, which coordinates the activities needed to execute the data integrity scan. The memory sub-system controller 115 identifies a page to be scanned, and sends a data integrity scan command (labeled "DATA INTEGRITY SCAN") to the local media controller 135 that identifies the specified page, and page order that includes the padding data.

Responsive to the data integrity scan command, the local media controller 135 provides inputs (e.g., randomizer seed, labeled "INPUTS" in FIG. 1C) to the randomizer 136 of the memory device 130 causing the randomizer 136 to re-generate the padding data (random data) written to the page of the array 133 for the specified page. These inputs can include the page address, the page order, etc. This re-generated padding data is employable for a comparison operation to identify discrepancies in the data stored in the array 133. Contemporaneously, the local media controller 135 executes a read operation (labeled "READ" in FIG. 1C) on the array 133 to sense (retrieve) stored padding data from the specified page.

In response to sensing the padding data from the array 133, the stored padding data (labeled "STORED PADDING DATA") sensed from the array 133 is placed into the page buffer 137. In response, the randomizer 136 executes an XOR operation (labeled "XOR" in FIG. 1C) to compare the stored padding data and the re-generated padding data. The randomizer 136 writes mismatched data (labeled "MIS-MATCH DATA") to the page buffer 137. The mismatched data characterizes bits in the re-generated padding data that do not match the stored padding data sensed from the array 133. The error counter 139 analyzes the mismatch data identifies and counts mismatches between the re-generated padding data (an expected pattern) and the stored padding data (actual data), pinpointing potential errors. This mismatch count provides a quantitative measure of the integrity of data in the specified page. Moreover, the error counter 139 outputs the mismatch count (labeled "MISMATCH COUNT") to the memory sub-system controller 115. Determining the mismatch count with the error counter 139 (integrated on the die of the memory device 130) avoids the need of transferring the padding data to the memory sub-system controller 115, thereby reducing bandwidth utilization during the data integrity scan. In some examples, the memory sub-system controller 115 employs the mismatch count to determine the health of the data in the memory device 130 and to determine if corrective actions are needed. In some examples, data characterizing the integrity and/or information indicating that corrective actions are needed is provided to the host system 120 in response to the data integrity scan request.

Referring back to FIG. 1A, by leveraging the on-die abilities of the memory device 130, such as the local media controller 135, and error counter 139, a thorough and efficient data integrity scan can be executed, curtailing the need for external data processing and reducing the overall system load. Thus, executing the data integrity scan in this manner enhances the reliability and performance of the memory device 130 by ensuring data integrity is maintained through precise and automated internal checks.

Furthermore, as noted, there can be multiple memory devices implemented in the memory sub-system 110 that are stacked in a three-dimensional (3D) array. Each memory device, including the memory device 130 and the memory device 140 include a corresponding local media controller 135. Because the data integrity scan does not require the transfer of stored data to the memory sub-system controller 115, the memory devices 130 and 140 can execute a data integrity scan in parallel. Moreover, because each data integrity scan has a relatively small data structure (e.g., 8 bytes or less) returned in the form of the mismatch mount to the memory sub-system controller 115, multiple mismatch counts can be provided contemporaneously to the memory sub-system controller 115. For example, in some situations, the memory sub-system 110 can receive 4 or more different mismatch counts contemporaneously, such that data integrity scans of pages across the memory sub-system 110 can be executed efficiently.

Figure 3:
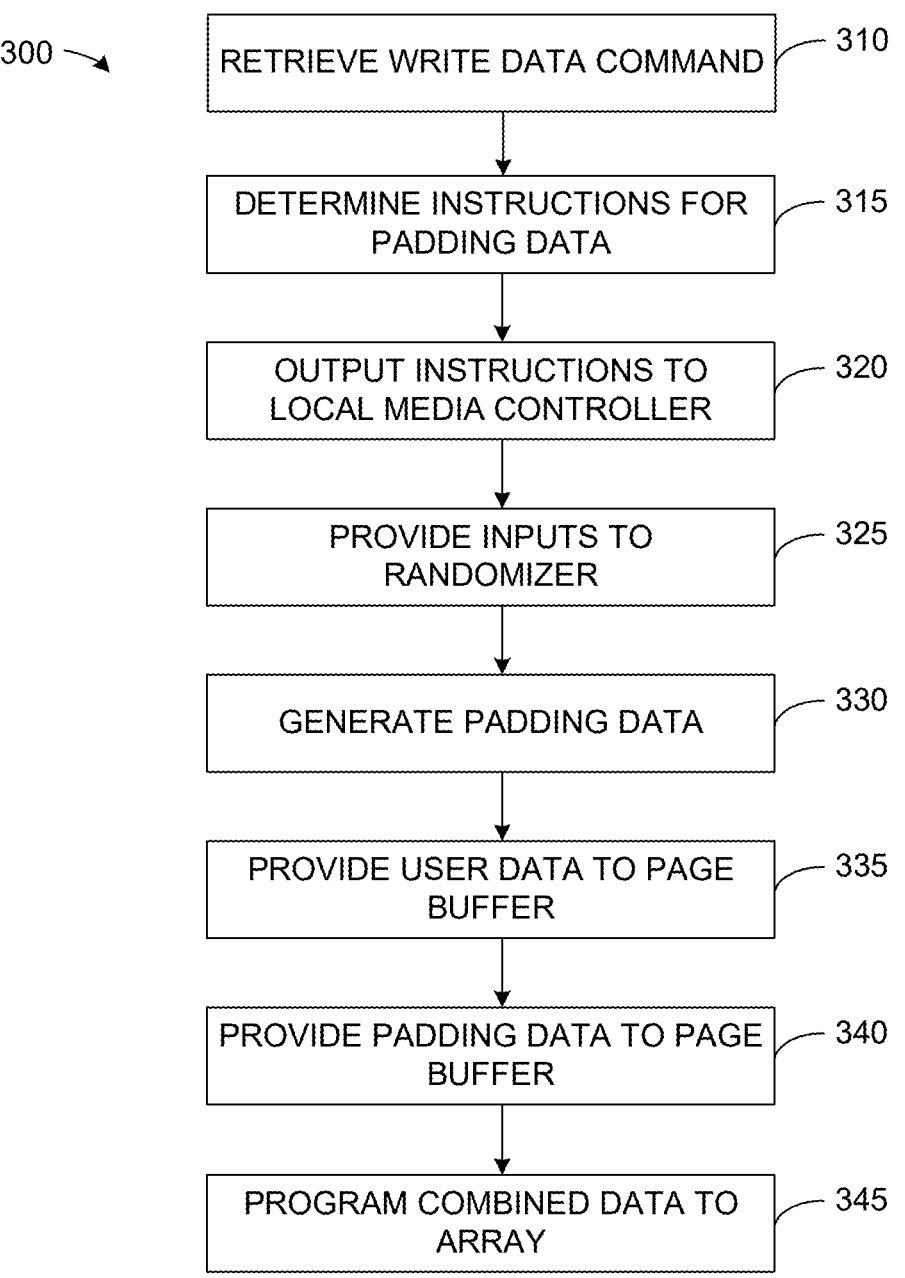
FIG. 3 illustrates a flowchart of an example method for padding user data for a write data command.

FIG. 3 illustrates a flowchart of an example method 300 for padding user data for a write data command. The method 300 can be executed by a memory sub-system, such as the memory sub-system 110. At block 310, a memory sub-system controller (e.g., the memory sub-system controller 115) receives the write data command. The write data command includes user data to be written to the memory sub-system. At block 315, in response to the write data command, the memory sub-system controller 115 determines instructions for padding the user data. To determine the instructions, the memory sub-system controller determines an address for data writing to a memory device (e.g., the memory device 130) and the need for of padding of the data to ensure efficient memory utilization and data integrity. The instructions for padding the user data can include, for example, a data block address, including page addresses for pages of the data block. The page addresses can include pages that are to hold the user data received by the memory sub-system controller with the write command, as well as addresses for the padding data. At block 320, the memory sub-system controller outputs the instructions for padding the user data to a local media controller of the memory device (e.g., the local media controller 135).

At block 325, the local media controller 135 provides inputs to a randomizer (e.g., the randomizer 136) for generating random data for the padding data based on inputs (e.g., page address, page order, etc.). The randomizer, along with the local media controller is integrated with a die of the memory device. At block 330, the randomizer generates padding data in response to the inputs. At block 335, the local media controller provides the user data (in the write command) to a page buffer (e.g., the page buffer 137). At block 340, the randomizer provides the padding data to the page buffer, such that both the user data in the write command and the padding data are combined, forming combined data in the page buffer. At block 345, the page buffer programs the combined data to the page addresses of an array (e.g., the array 133) identified by the memory sub-system controller. In this manner, the combined data is stored permanently in the designated memory cells of the array. In other examples, rather than writing the combined data to the memory cells of the array, the user data and the padding data are written to the array in separate operations.

Figure 4:
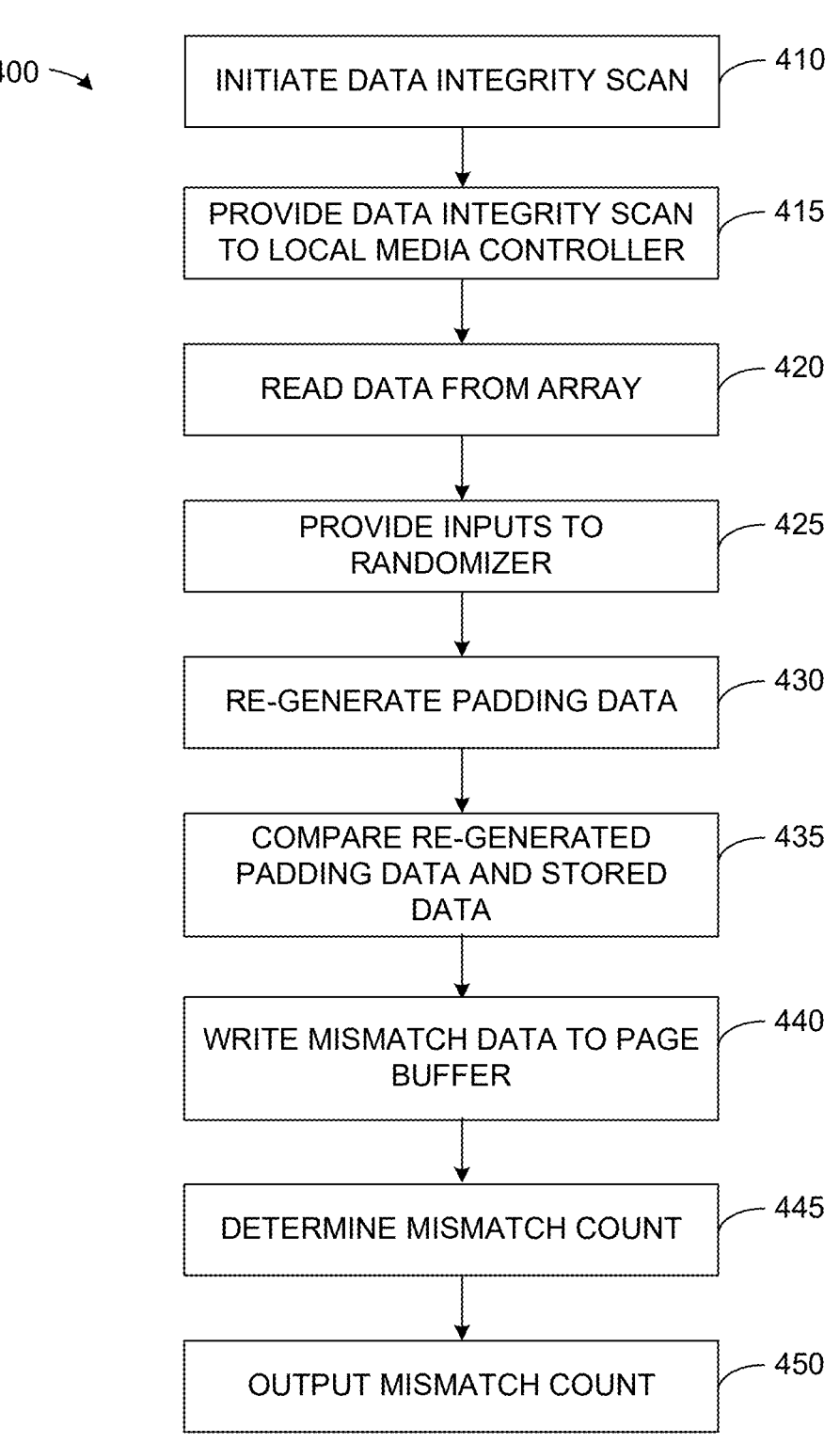
FIG. 4 illustrates a flowchart of an example method executing a data integrity scan of a specified page that stores padding data.

FIG. 4 illustrates a flowchart of an example method 400 executing a data integrity scan of a specified page that stores padded data. The method 400 can be executed by a memory sub-system, such as the memory sub-system 110. At block 410, a memory sub-system controller (e.g., the memory sub-system controller 115) initiates a data integrity scan on the specified page with padding data (random data). The memory sub-system controller identifies, for example, an address of the specified page, as well as a page order. The data integrity scan could be executed, for example, in response to a host system (e.g., the host system 120) sending a request to perform a data integrity scan (e.g., a data integrity scan request) on pages (or a single page) within a memory device (e.g., the memory device 130). At block 415 the memory sub-system controller sends data integrity scan command to a memory sub-system controller (e.g., the memory sub-system controller 115) that identifies the specified page, and a page order that includes the padding data.

At block 420, responsive to the data integrity scan command, the local media controller executes a read operation on an array (e.g., the array 133) to sense (retrieve) stored padding data from the specified page, and the stored padding data is written to a page buffer (e.g., the page buffer 137).

Additionally, at block 425, also in response to the data integrity scan command, the local media controller 135 provides inputs (e.g., randomizer seed) to a randomizer of the memory device (e.g., the randomizer 136). These inputs (e.g., parameters) can include the page address, the page order, etc. In response to the inputs, at block 430, the randomizer re-generates the padding data (random data) that matches the padding data written to the page of the array for the specified page. This re-generated padding data is employable for a comparison operation to identify discrepancies in the data stored in the array (e.g., stored padding data). Accordingly, in response to writing the stored padding data to the page buffer at block 435, the randomizer compares the stored padding data and the re-generated padding data (e.g., using an XOR operation). At block 440, the XOR operation writes mismatched data to the page buffer. The mismatched data characterizes bits in the re-generated padding data that do not match the stored padding data sensed from the array.

At block 445, an error counter (e.g., the error counter 139) analyzes the mismatch data identifies and determines a mismatch count characterizing a number of mismatches between the re-generated padding data (an expected pattern) and the stored padding data (actual data), pinpointing potential errors. This mismatch count provides a quantitative measure of the integrity of data in the specified page. At block 450, the error counter outputs the mismatch count to the memory sub-system controller. Determining the mismatch count with the error counter (integrated on the die of the memory device) avoids the need of transferring the padding data to the memory sub-system controller, thereby reducing bandwidth utilization during the data integrity scan.

Figure 5:
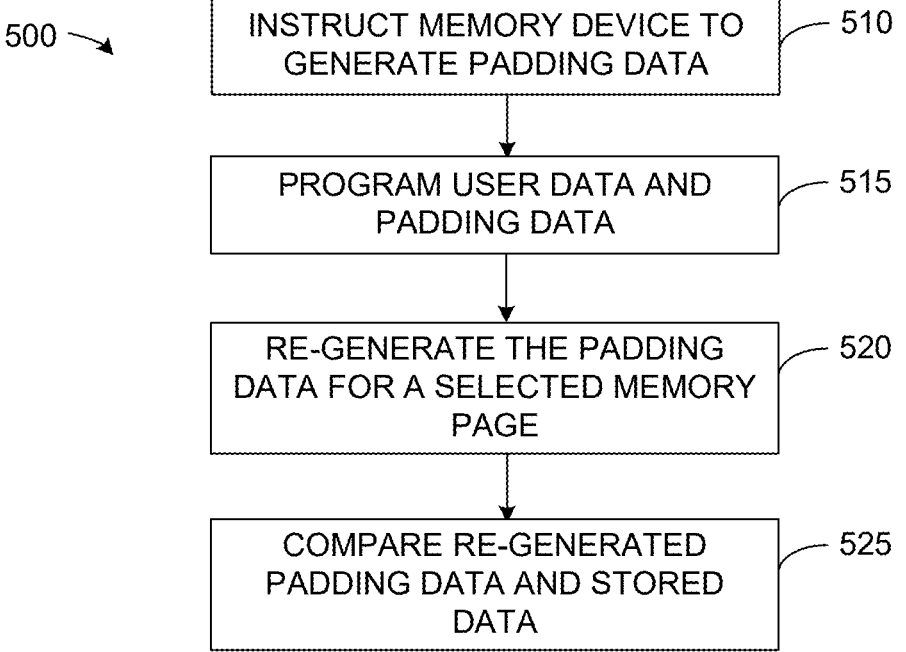
FIG. 5 illustrates a flowchart of an example method for a memory sub-system controller to direct operations of a memory device to manage data.

FIG. 5 illustrates a flowchart of an example method 500 for managing data in a non-volatile memory system, such as the memory sub-system 110. The operations for the method 500 can be executed for example by, a memory sub-system controller (e.g., the memory sub-system controller 115) and a local media controller (e.g., the local media controller 135) of a memory device (e.g., the memory device 130) operating in concert. The memory controller and the local media controller store machine-readable instructions that are executable (e.g., by a processor of the memory controller and/or the local media controller). At block 510, the memory sub-system controller instructs the memory device (e.g., the memory device 130) of the non-volatile memory system that includes an integrated randomizer to generate padding data to close a memory block for a write data command that includes user data. At block 515, the memory sub-system controller directs the memory device (e.g., through the continued execution of instructions on the local media controller) to program the user data and the generated padding into specified memory pages within the memory die. At block 520, the memory sub-system controller directs the memory device (e.g., through the continued execution of the instructions on the local media controller) to cause the randomizer to re-generate the padding data for a selected memory page of the specified memory pages for a data integrity scan. The randomizer is configured to re-generate the padding data based on a same set of parameters used to generate the padding data stored in the selected memory page. At block 525, the memory sub-system controller directs the memory device to compare the re-generated padding data with stored padding data sensed from the memory device to identify discrepancies for the data integrity scan.

Figure 6:
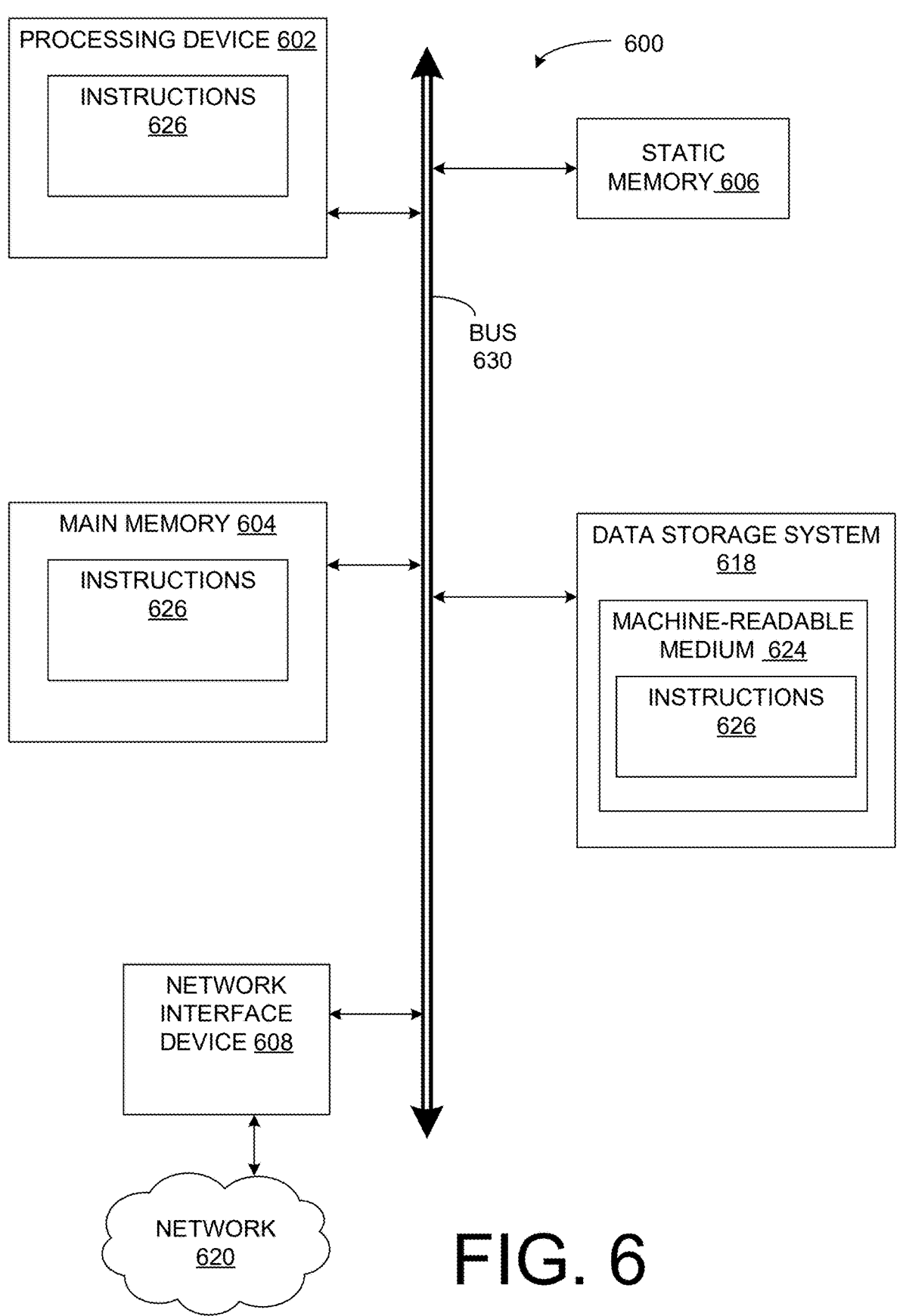
FIG. 6 illustrates an example machine of a computer system (a machine) within which a set of instructions, for causing the machine to perform any one or more of the methodologies discussed herein, can be executed.

FIG. 6 illustrates an example machine of a computer system 600 (a machine) within which a set of instructions, for causing the machine to perform any one or more of the methodologies discussed herein, can be executed. In some examples, the computer system 600 corresponds to a host system (e.g., the host system 120 of FIG. 1A) that includes, is coupled to, or utilizes a memory sub-system (e.g., the memory sub-system 110 of FIG. 1A) or is used to perform the operations of a controller. In other examples, the machine is connected (e.g., networked) to other machines in a LAN, an intranet, an extranet and/or the Internet. In various examples, the machine operates in the capacity of a server or a client machine in client server network environment, as a peer machine in a peer-to-peer (or distributed)

network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automobile, a data center, a smart factory or other industrial application. Further, while a single machine is illustrated, the term "machine" shall also be taken to include any collection of machines that individually or jointly execute a set (or multiple sets) of instructions to perform the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM) or other non-transitory computer-readable media) and a data storage system 618, which communicate with each other via a bus 630.

The processing device 602 represents one or more general-purpose processing devices such as a microprocessor, a central processing unit, etc. More particularly, the processing device 602 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 602 is implemented with a special-purpose processing devices such as an application specific integrated circuit (ASIC), a field programmable gate array (FPGA), a digital signal processor (DSP), network processor, etc. The processing device 602 is configured to execute instructions 626 for performing the operations discussed herein. In some examples, the computer system 600 includes a network interface device 608 to communicate over the network 620.

The data storage system 618 includes a machine-readable storage medium 624 (also known as a computer-readable medium) that store sets of instructions 626 or software for executing the methodologies and/or functions described herein. The machine-readable storage medium 624 is a non-transitory medium. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618 and/or main memory 604 can correspond to the memory sub-system 110 of FIG. 1A. Accordingly, the machine-readable storage medium 624, the data storage system 618 and/or the main memory 604 are examples of non-transitory computer-readable media.

In some examples, the instructions 626 include instructions to a data write and/or a data integrity scan. While the machine-readable storage medium 624 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for managing data in a non-volatile memory system, comprising:

generating, by a randomizer integrated on a die of a memory device, padding data to close a memory block for a data write operation, wherein the padding data is random data;

programming, by a media controller of the memory device, the padding data into specified memory pages in a data block within the memory device, wherein the data block stores user data for the data write operation and the padding data; and executing, by the media controller responsive to a command from a memory controller, a data integrity scan on a selected memory page of the specified memory pages of the data block, wherein the executing of the data integrity scan comprises:

re-generating, by the randomizer, the padding data for the selected memory page based on a same set of parameters used to generate the padding data stored in the selected memory page;

comparing the re-generated padding data with stored padding data sensed from the selected memory page to by performing a comparison operation in a page buffer integrated on the die of the memory device to generate mismatch data;

counting, by an error counter integrated on the die of the memory device, a number of mismatches between the re-generated padding data and the stored padding data based on the mismatch data to determine an error count; and transmitting the error count from the memory device to the memory controller in response to the data integrity scan.

2. The method of claim 1, wherein the memory pages specified for programming the user data and the padding data are determined by the memory controller configured to define start and end memory pages of the memory block.

3. The method of claim 1, wherein the memory device is a Not-AND (NAND) memory chip.

4. The method of claim 1, wherein the data integrity scan is triggered periodically by the memory controller to maintain data reliability.

5. The method of claim 1, wherein the memory controller uses the count to determine a health of the data stored in the memory device.

6. The method of claim 1, wherein the data padding is generated based on inputs characterizing an address of the specified memory pages by the media controller.

7. The method of claim 1, wherein the comparing comprises applying an XOR operation to the re-generated padding data and the stored padding data.

8. A system for managing data in a non-volatile memory system, comprising:

a memory device with an integrated randomizer configured to generate padding data to close a data block for a write operation of user data, the padding data comprising random data; and a memory controller programmed to direct the memory device to program the user data and the generated padding data into specified memory pages of a memory block within the memory device;

wherein the memory controller is configured to direct the memory device to cause the randomizer to re-generate the padding data for a selected memory page of the specified memory pages based on a same set of parameters used to generate the padding data stored in the selected memory page and perform a comparison operation between the re-generated padding data and stored padding data sensed from the selected memory page in a page buffer integrated on a die of the memory device to generate mismatch data for a data integrity scan, and the memory device further comprises:

an error counter integrated on the die of the memory device and configured to count a number of mismatches between the re-generated padding data and the stored padding data based on the mismatch data to determine an error count;

wherein the memory device is configured to transmit the error count to the memory controller in response to the data integrity scan.

9. The system of claim 8, wherein the memory device is a Not-AND (NAND) memory chip.

10. The system of claim 8, wherein the memory controller is further configured to define start and end memory pages for the programming of the user data and the padding data of the memory block.

11. The system of claim 8, wherein the memory controller is configured to periodically execute the data integrity scan to maintain data reliability in the memory device.

12. The system of claim 8, wherein the comparison operation is an XOR operation on the stored padding data and the re-generated padding data to identify the mismatches.

13. The system of claim 8, wherein the memory device includes a local media controller configured to receive a padding data command and to instruct the randomizer to generate the padding data responsive to the padding data command.

14. A non-transitory computer-readable medium storing instructions that, when executed by a processor, perform operations for managing data in a non-volatile memory system, the operations comprising:

instructing a memory device that includes an integrated randomizer to generate padding data to close a memory block for a write data command that includes user data, wherein the padding data is random data;

directing the memory device to program the user data and the padding data into specified memory pages within the memory device;

directing the memory device to cause the randomizer to re-generate the padding data for a selected memory page of the specified memory pages based on a same set of parameters used to generate the padding data stored in the selected memory page and to perform a comparison operation between the re-generated padding data and stored padding data sensed from the selected memory page in a page buffer integrated on a die of the memory device to generate mismatch data for a data integrity scan;

directing an error counter integrated on the die of the memory device to count a number of mismatches between the re-generated padding data and the stored padding data based on the mismatch data to determine an error count; and causing the memory device to transmit the error count to a memory controller in response to the data integrity scan.

15. The non-transitory computer-readable medium of claim 14, wherein the instructions further comprise directives for a memory controller to define start and end memory pages for the programming of the user data and the programmed data.

16. The non-transitory computer-readable medium of claim 14, wherein the re-generating of the padding data is executed for a data integrity scan to maintain data reliability.

17. The non-transitory computer-readable medium of claim 14, wherein the comparison operation is an XOR operation on the stored padding data and the re-generated padding data to identify the mismatches.

\* \* \* \* \*